(12) United States Patent
Casota

(10) Patent No.: US 8,099,872 B2
(45) Date of Patent: Jan. 24, 2012

(54) GUIDE DEVICE FOR A SAW BLADE THAT EXECUTES LIFTING MOTIONS

(75) Inventor: Marcel Casota, Gelterkinden (CH)

(73) Assignee: Robert Bosch GmbH, Stuttgart (DE)

( * ) Notice: Subject to any disclaimer, the term of this patent is extended or adjusted under 35 U.S.C. 154(b) by 305 days.

(21) Appl. No.: 12/064,038

(22) PCT Filed: Apr. 3, 2007

(86) PCT No.: PCT/EP2007/053204
§ 371 (c)(1),
(2), (4) Date: Feb. 18, 2008

(87) PCT Pub. No.: WO2007/137894
PCT Pub. Date: Dec. 6, 2007

(65) Prior Publication Data
US 2008/0229588 A1    Sep. 25, 2008

(30) Foreign Application Priority Data
Jun. 1, 2006  (DE) ................... 10 2006 026 022

(51) Int. Cl.
*B23D 51/10*  (2006.01)
*B23D 49/10*  (2006.01)
(52) U.S. Cl. ............... 30/392; 30/393; 30/394
(58) Field of Classification Search ........... 30/392–394, 30/289, 290, 380, 370
See application file for complete search history.

(56) References Cited

U.S. PATENT DOCUMENTS

| 2,775,272 | A | * | 12/1956 | Papworth | 30/393 |
| 3,388,728 | A | * | 6/1968 | Riley, Jr. et al. | 30/392 |
| 4,272,996 | A | * | 6/1981 | Sauerwein | 74/50 |
| 5,644,847 | A | * | 7/1997 | Odendahl et al. | 30/394 |
| 7,497,154 | B2 | | 3/2009 | Delfini et al. | |
| 2006/0060054 | A1 | | 3/2006 | Delfini et al. | |

FOREIGN PATENT DOCUMENTS

| CN | 1751833 | 3/2006 |
| DE | 43 20 233 | 6/1994 |
| DE | 10 2004 045 623 | 4/2006 |
| EP | 0 763 353 | 3/1997 |

* cited by examiner

*Primary Examiner* — Phong Nguyen
(74) *Attorney, Agent, or Firm* — Michael J. Striker

(57) ABSTRACT

The invention relates to a guide device (1) for a saw blade (2), in particular for an electric tool, which is operated in reciprocating motion (H) and which comprises a clamping device (4) engaging in the clamping end (3) of the saw blade (2), and a pendulum guide device (5) attached to the back of the saw blade and located at an axial distance (a) from the clamping device (4). According to the invention, the pendulum guide device (5) features at least two guide elements (6) which are arranged at an axial distance from each other. The invention further relates to an electric tool which features said guide device (1). Moreover, the invention relates to an electric tool with said guide device (1), in particular a jigsaw (23).

7 Claims, 2 Drawing Sheets

GUIDE DEVICE FOR A SAW BLADE THAT EXECUTES LIFTING MOTIONS

PRIOR ART

Saw blades that execute lifting motions are known. They are used in particular in jigsaws and similar power tools. The lateral guidance and bracing of the saw blade during the sawing operation is definitively responsible for the quality of the cut. That is, during the lifting motion the saw blade has a tendency to deflect in response to the resistance presented by the material being cut. Viewed in the cutting direction, a motion of the end of the saw blade (the end not fastened in the driven clamping device) to the left or right must therefore be expected; viewed in the cutting direction, the saw blade must deviate from the lifting motion expected for it, which is essentially vertical to the surface of the material being cut. The cutting quality suffers as a result. Moreover, the service life of the saw blade is greatly reduced by the mechanical sagging.

In the prior art, it is therefore known to guide the saw blade so as to keep free travel lengths within the lifting motion, within which the saw blade can deflect or deviate, short. Embodiments are therefore usual in which the guidance of the saw blade of jigsaws takes place via a plunge cut on a guide or bracing roller between the clamping device that drives the saw blade and the material being cut and/or the saw blade is guided laterally. Embodiments are also known which accomplish this guidance additionally via separate guide jaws in the region immediately above the material being cut, for instance in a sawing or guide table associated with the power tool. For that purpose, guide jaws located on both sides of the saw blade are for instance used.

A disadvantage of these embodiments is that the known guides of the saw blade do not sufficiently prevent deviation of the saw blade during the lifting motion. The saw blade itself is deformed in a curved way around the guide element (especially if there is only one guide roller between the clamping device and the material being cut), and the one guide element acts as a node point with regard to the development of the curved shape. Accordingly, if viewed in the cutting direction the saw blade migrates toward the left in the material being cut, then it is made to sag to the right or deformed to the right between the guide roller and the clamping device. This deformation occurring between the guide roller and the clamping device not only reduces the service life of the saw blade but is also considered to be part of the cause for the deviation or improper course of the saw blade in the material being cut. In the region of the clamping device, the attempt has consequently been made, by means of centering devices, largely to prevent the saw blade from executing this deformation; however, this version has neither had the desired success nor been feasible at reasonable expense or even in a user-friendly way. The guidance by separate guide jaws between the guide roller and the material being cut is complex and non-user-friendly, since an adjustment of the jaws must be made for different saw blades and different thicknesses of saw blades. Moreover, the friction occurring from these guide jaws causes wear and a thermal load on both the saw blade and the guide jaws. In addition, these expanded guides known in the prior art are not capable of going along with the pendulum motions of the saw blade, motions that are usual in the case of pendulum stroke jigsaws, for instance.

DISCLOSURE OF THE INVENTION

By comparison, the invention offers the advantage of furnishing bracing and guidance of the saw blade with which a better cutting quality can be achieved, and which overcomes the aforementioned disadvantages.

To that end, a guide device for a saw blade that executes lifting motions, in particular for a power tool, having a clamping device engaging the fastening end of the saw blade and having a pendulum guide device, associated with the spine of the saw blade and located axially spaced apart from the clamping device, is provided, in which the pendulum guide device has at least two axially spaced-apart guide elements. A pendulum guide device in terms of the invention is one that goes along with the pendulum motions of a saw blade in the cutting direction and counter to the cutting direction. Axially, or in other words in the direction of the length of the saw blade, to the clamping device that engages the end of the saw blade (this clamping device serves to drive the saw blade in the up and down direction and is embodied as a non-cutting end of the saw blade), there is accordingly a spaced-apart pendulum guide device, which in turn includes at least two guide elements, which are spaced apart from one another axially, or in other words in the longitudinal direction of the saw blade. As a result, between the clamping device and the material being cut in the lengthwise course of the saw blade, two further guide elements are created, which practically entirely prevent the aforementioned curved sagging that is observed when there is only one guide element between the material being cut and the clamping device, or even if there is a jaw guide, immediately adjacent the material being cut, and a further guide.

ADVANTAGES OF THE INVENTION

In a preferred embodiment of the invention, it is provided that the guide elements are embodied as guide rollers. In the embodiment as guide rollers, friction losses between the saw blade that executes lifting motions and the guide elements are drastically reduced, since the rollers accordingly go along with the up-and-down motions, and hence there is no friction or braking action that would moreover be associated with thermal losses and attendant fit problems because of different temperature coefficients of different materials, and which would furthermore lead to a reduced service life of the material.

In an especially preferred embodiment, the guide rollers each have a substantially conical guide groove. A substantially conical guide groove is one that has oblique side walls. It is therefore possible for the saw blade, regardless of its thickness, to center itself automatically in the guide rollers during the lifting motions. Inconvenient calibration, especially when different saw blade thicknesses or types are used, becomes superfluous, since the saw blade always seeks to assume the most favorable position on the bottom of the conical guide groove with regard to the equilibrium of the forces involved, rather than seeking a position on the oblique side walls of the guide groove. Moreover, this kind of guidance, since it engages solely the spine of the saw blade, remote from the saw blade teeth, or the side faces of the saw blade that are associated with the spine of the saw blade, is completely independent of the type of saw blade toothing (set, undulating, ground with clearance angles) and completely independent of the spacing between the tooth base and the spine of the saw blade.

In a further preferred embodiment, it is provided that the pendulum guide device, for receiving the guide rollers, has a connection element. Examples of connection elements are connecting bridges, plates, bearing elements, or the like, which are located on both sides of the guide rollers and fix the guide rollers in a precisely defined position relative to one another and thus, for instance by receiving guide roller axles, make a free rotary motion of the guide rollers possible. A connection element of this kind may also be embodied as a cage or in some similar way.

In an especially preferred embodiment of the invention, the connection element is rotatably supported on a roller lever. The roller lever here is considered to be a mount for the component embodied by the connection element and the guide roller and that has a rotary bearing which receives the connection element. The connection element can accordingly rotate freely in an at least restricted region on the roller lever about an axis of rotation located parallel to the guide roller axles supported in it. This assures that even when pendulum lifting motions are executed, both guide rollers maintain their contact with the saw blade spine, and guidance of the saw blade is ensured in every phase of the pendulum hug.

The invention also furnishes a power tool which has a guide device as described above.

In a preferred embodiment, the power tool is a hand power tool, that is, one that can be operated in mobile fashion by a user in his hand. In a special embodiment of the invention, this hand power tool is embodied as a jigsaw. Precisely in this embodiment, the use of the guide device of the invention is quite particularly advantageous.

Further advantageous embodiments of the invention will become apparent from the dependent claims and combinations of those claims.

BRIEF DESCRIPTION OF THE DRAWINGS

The invention is described in further detail below in conjunction with drawings.

DETAILED DESCRIPTION

Figure 1:
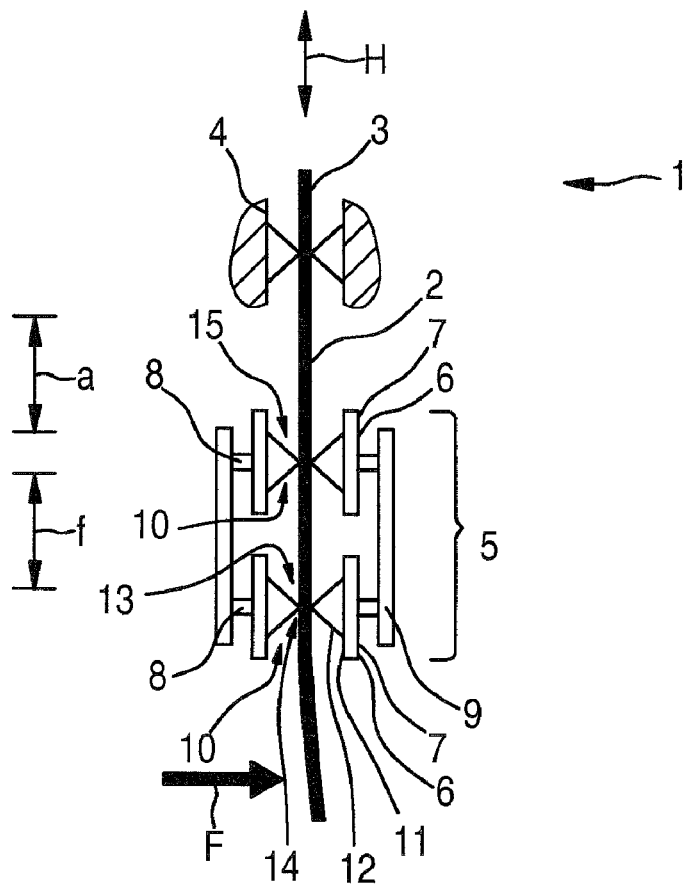
FIG. 1 shows a schematic view of the guide device.

FIG. 1 schematically shows a guide device 1 for a saw blade 2 that executes lifting motions H. It has a clamping device, engaging a fastening end 3 of the saw blade 2, and a pendulum guide device 5, at an axial spacing a from the clamping device, oriented longitudinally of the saw blade. The pendulum guide device 5 has two guide elements 6, which are embodied as guide rollers 7 that are rotatably supported on guide roller axles 8; the guide roller axles 8 have an axial spacing f from one another. The guide roller axles 8 are in turn supported on both sides in a connection element 9. Centrally on their circumference, the guide rollers 7 each have a substantially conical guide groove 10, which accomplishes self-centering of the saw blade 2 in the guide roller 7. The conical guide grooves 10 of both guide rollers 7 are aligned with one another.

If in the course of the sawing operation a force F in the direction of the directional arrow is exerted on the saw blade 2, then the saw blade 2 executing lifting motions H will deflect in the direction of the force F. The guide roller 7, embodied as the a guide roller 11, of the pendulum guide device 5, as a result of its embodiment with a conical guide groove 10, will counteract this deflection motion that takes place in the direction of the force F, since in this deflection event the saw blade must slide along a rising flank 12 of the conical guide groove 10, so that on the lower guide roller 11, on the rising flank 12, a force acting counter to the force F ensues, which forces the saw blade 2 back into a lowermost point 13 that is embodied on the bottom 14 of the guide groove 10. The position on this bottom 14 of the guide groove 10 is the preferred position, based on the force equilibrium, of the saw blade 2, and the saw blade will therefore always seek to resume this position as quickly as possible. Similar conditions to those described for the lower guide roller 11 pertain to the other guide roller 7, embodied as an upper guide roller 15, of the pendulum guide device 5 as well. Because of the embodiment of the guide rollers 7 with a conical guide groove 10, it does not matter whether a motion of the saw blade 2 takes place to the left or the right, relative to the cutting direction. The saw blade will always seek to resume the position of maximum force equilibrium on the bottom 14 of the conical guide groove 10 of each guide roller 7 as quickly as possible. As a result, precisely because of the dynamics of the lifting motions H in conjunction with the embodiment of the guide rollers 7 by means of the conical guide groove 10, with the bottom 14 of each guide roller 7 being aligned with the bottom 14 of the respective other guide roller 7, automatic centering and automatic stabilization of the saw blade 2 in operation ensues.

Figure 2:
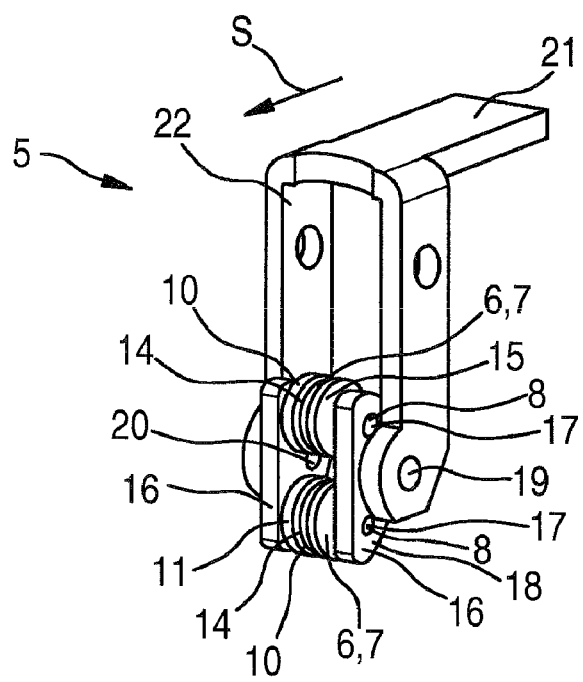
FIG. 2 shows a pendulum guide device, with two guide elements axially spaced apart from one another.

FIG. 2 shows the pendulum guide device 5 with the axially spaced-apart guide elements 6, which in turn are embodied as guide rollers 7. The guide rollers 7 are retained on both sides by a connection element 9, and each guide roller 7 is rotatably supported on a guide roller axle 8 associated with it. The connection element 9 is embodied in the form of a plate 16, which has receptacles 17 for the guide roller axles 8. Between the connection elements 9, the guide rollers 7 are supported in such a way that the bottom 14 of the conical guide groove 10 of the lower guide roller 11 is aligned with the bottom 14 of the conical guide groove 10 of the upper guide roller 15. This entire arrangement forms a guide roller pendulum 18. The guide roller pendulum 18 is rotatably supported, on the left and right connection element 9, respectively, by means of a left pendulum axle 19 and a right pendulum axle 20 in a roller lever 21 that is embodied essentially as a two-tined fork 22. As a result, it is possible for the guide roller pendulum 18 to cause each of the two guide rollers 7 during operation, and in particular including when pendulum lifting motions are being executed, to maintain contact at all times with the spine, not shown, of the saw blade 2, not shown. In no phase, even of the pendulum lifting motion, is the contact between the guide rollers 7 and the spine of the saw blade lost. This is true particularly whenever the pendulum lifting motion is effected via the roller lever 21 itself, or in other words when in the course of the lifting motion H (as shown in FIG. 1), the roller lever 21 itself first generates the pendulum lifting motion by exerting a force in the cutting direction S and periodically engaging the spine of the saw blade 2; this force is transmitted via the guide rollers 7 and is added to the lifting motion H (FIG. 1).

Figure 3:
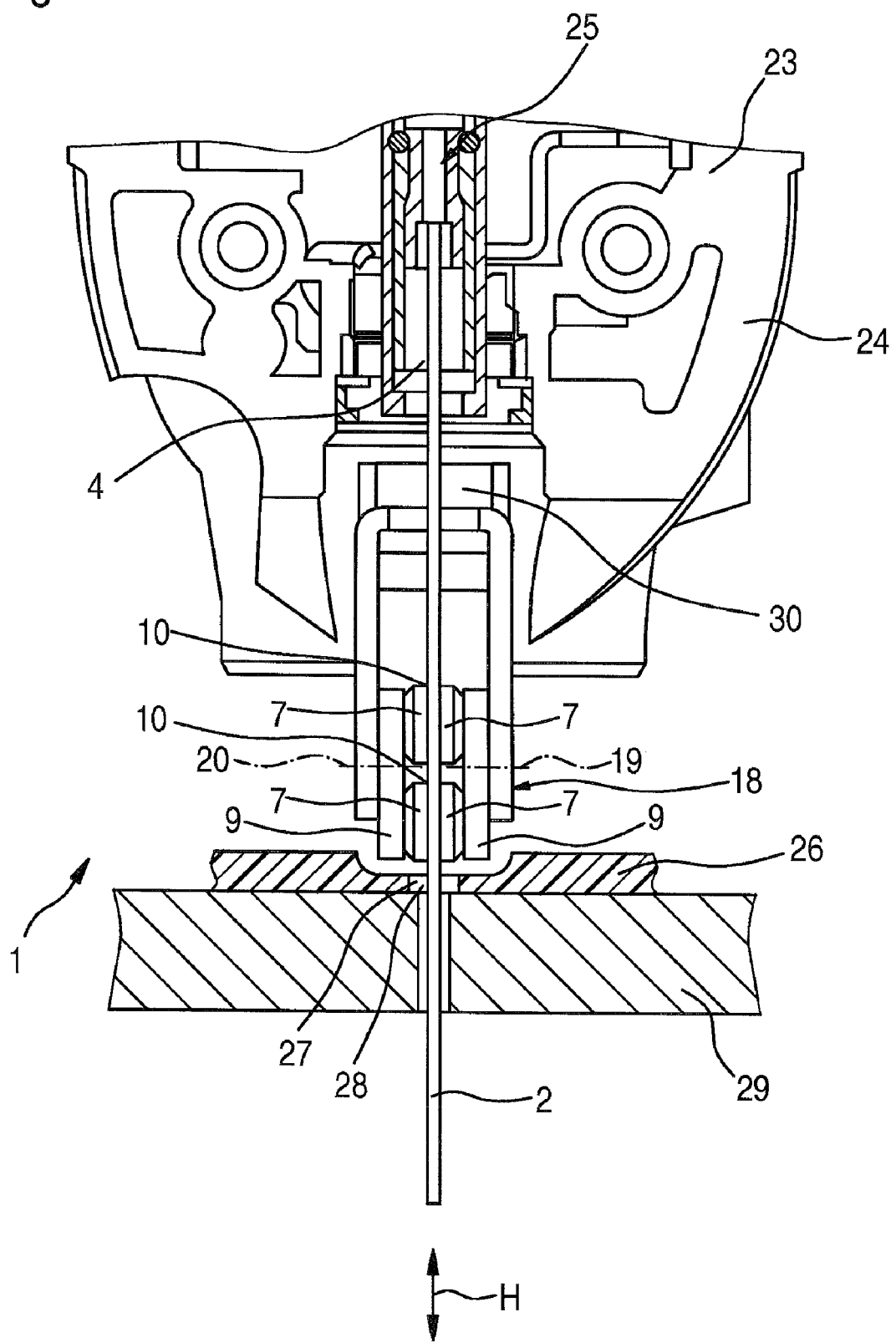
FIG. 3 shows a guide device in the installed position in a jigsaw.

FIG. 3 shows the guide device 1 in the installed position in a jigsaw 23, whose front gearhead 24 is shown in section. The force-locking fixation of the saw blade 2 takes place at the clamping device 4 on a lifting rod mechanism 25, which is provided for generating the lifting motion H, and thus the saw blade goes along with the lifting motion H of the lifting rod mechanism 25. The jigsaw 23 has a working foot 26, shown only partially, which has a partial opening 28 in the region of a saw blade passage 27. The working foot 26 serves to place the jigsaw 23 on a material 29 that is to be cut and to guide it there. Immediately adjacent to the working foot 26, the saw blade 2 is guided via the guide rollers 7, which are rotatably supported in the guide roller pendulum 18 formed of connection elements 9. The connection elements 9 are in turn rotatably supported in the roller lever 21 via the left pendulum axis 19 and the right pendulum axis 20, respectively, so that regardless of which phase of a pendulum lifting motion (that is, a motion which in addition to the lifting motion H has a further component executes a motion toward the observer and back again) the saw blade 2 is in at that specific time, the spine, in this view facing away from the observer, of the saw blade 2 is guided in the guide rollers 7; each guide roller has an aligned guide groove 10, which has a bottom 14, not visible here. For that purpose, the roller lever 21 is connected, in particular operatively connected, to a roller lever receptacle 30, not shown in detail here, of the jigsaw 23.

The invention claimed is:

1. A guide device for a saw blade that executes lifting motions, comprising:
    a clamping device engaging a fastening end of the saw blade (2),
    a pendulum guide device (5), associated with a saw blade spine, located axially spaced apart from the clamping device,
    wherein the pendulum guide device (5) has two axially spaced-apart guide elements (6) embodied as guide rollers (7) that are rotatably supported on guide roller axles (8) spaced from one another in a substantially vertical direction, which each guide rollers (7) has a substantially conical guide groove (10) for self-centering the saw blade spine,
    wherein the pendulum guide device (5) includes a pair of connection elements (9), each embodied in a form of a plate (16) and positioned on opposing sides of the guide rollers (7), which the pair of connection elements (9) receive the vertically spaced guide roller axles (8) of the guide rollers (7) together, and
    a roller lever (21) rotatably supporting the pair of connection elements (9) via a left pendulum axle (19) and a right pendulum axle (20),
    wherein the roller lever (21) is formed as a fork having a single horizontal upper part and two tines extending substantially vertically downwardly from the single horizontal upper part, wherein the pair of plates (16) includes a left connection plate rotatably supported on a left tine by the left pendulum axle, and a right connection plate rotatably supported on a right tine by the right pendulum axle, and wherein each pendulum axle is positioned in a midsection of each plate and at an end of each tine.

2. The guide device as defined by claim 1, wherein the guide rollers (7) are supported so that a bottom (14) of a conical guide groove (10) of one of the guide rollers (11) is aligned with a bottom (14) of a conical guide groove (10) of the other of the guide rollers (15).

3. The guide device as defined by claim 2, wherein the connection element (9) and the guide rollers (7) form a guide roller pendulum (18).

4. The guide device as defined by claim 3, wherein the roller lever (21) affects a lifting motion of the pendulum (18) to maintain and guide the saw blade (2) in the guide rollers (7).

5. A power tool comprising a guide device, the guide device comprising:
    a clamping device engaging a fastening end of the saw blade (2),
    a pendulum guide device (5), associated with a saw blade spine, located axially spaced apart from the clamping device,
    wherein the pendulum guide device (5) has two axially spaced-apart guide elements (6) embodied as guide rollers (7) that are rotatably supported on guide roller axles (8) spaced from one another in a substantially vertical direction, which each guide rollers (7) has a substantially conical guide groove (10) for self-centering the saw blade spine,
    wherein the pendulum guide device (5) includes a pair of connection elements (9), each embodied in a form of a plate (16) and positioned on opposing sides of the guide rollers (7), which the pair of connection elements (9) receive the vertically spaced guide roller axles (8) of the guide rollers (7) together, and
    a roller lever (21) rotatably supporting the pair of connection elements (9) via a left pendulum axle (19) and a right pendulum axle (20),
    wherein the roller lever (21) is formed as a fork having a single horizontal upper part and two tines extending substantially vertically downwardly from the single horizontal upper part, wherein the pair of plates (16) includes a left connection plate rotatably supported on a left tine by the left pendulum axle, and a right connection plate rotatably supported on a right tine by the right pendulum axle, and wherein each pendulum axle is positioned in a midsection of each plate and at an end of each tine.

6. The power tool as defined by claim 5, wherein the power tool is a hand power tool.

7. The power tool as defined by claim 6, wherein the hand power tool is a jigsaw (23).

* * * * *